United States Patent
Boyle

(10) Patent No.: US 6,901,245 B1
(45) Date of Patent: May 31, 2005

(54) ELONGATE PERSONAL COMMUNICATIONS APPARATUS

(75) Inventor: Kevin R. Boyle, Horsham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 585 days.

(21) Appl. No.: 09/639,153

(22) Filed: Aug. 16, 2000

(30) Foreign Application Priority Data

Aug. 20, 1999 (GB) .............................................. 9919668

(51) Int. Cl.$^7$ ................................................ H04Q 7/20
(52) U.S. Cl. ......................... 455/90.3; 455/575; 455/95
(58) Field of Search .......................... 455/403, 25, 550, 455/553, 556, 562, 575, 90, 95, 97, 74, 344; 343/702, 720, 895; 379/433.1, 433.11, 433.12, 433.13

(56) References Cited

U.S. PATENT DOCUMENTS

| | | | | |
|---|---|---|---|---|
| 487,818 | A | * 12/1892 | Band | .................. 425/302.1 |
| 4,969,180 | A | 11/1990 | Watterson et al. | ............ 379/58 |
| 5,138,651 | A | * 8/1992 | Sudo | ..................... 455/462 |
| 5,564,082 | A | * 10/1996 | Blonder et al. | ............... 455/90 |
| 5,754,645 | A | * 5/1998 | Metroka et al. | ....... 379/433.12 |
| 5,905,467 | A | 5/1999 | Narayanaswamy et al. | . 343/702 |
| 6,028,556 | A | * 2/2000 | Shiraki | .................... 343/702 |
| 6,259,416 | B1 | * 7/2001 | Qi et al. | .................... 343/767 |
| 6,487,421 | B2 | * 11/2002 | Hess et al. | ................. 455/550 |

FOREIGN PATENT DOCUMENTS

| | | | |
|---|---|---|---|
| EP | 0752735 A1 | 1/1997 | ............ H01Q/1/24 |
| WO | 9723016 A | 6/1997 | ............ H01Q/2/24 |

OTHER PUBLICATIONS

By R.J. Clarke "A Statistical Theory of Mobile–Radio Reception"; Bell Systems Technical Journal, vol. 47, No. 6, pp. 957–100.
Patent Abstract of Japan vol. 006, No. 055 (E–101), Apr. 10, 1982 corresponds to JP 56168437, Dec. 24, 1981.

* cited by examiner

Primary Examiner—Jean Gelin
(74) Attorney, Agent, or Firm—Dicran Halajian

(57) ABSTRACT

A personal communications apparatus comprises an elongate body 202 incorporating an antenna diversity arrangement in which first and second antennas (102A, 102B) are located at opposite ends of the body.

In one embodiment a microphone (114) is located at the tip of one antenna (102A) and a loudspeaker (116) at the tip of the other antenna (102B). The microphone (114) and loudspeaker (116) act as top loads to their respective antennas, thereby enabling the use of shorter antennas. The antennas (102A, 102B) may be formed from coaxial cable, enabling them to provide electrical connections between the microphone (114) or loudspeaker (116) and transceiver circuitry in the body of the apparatus. By arranging for the microphone (114) and loudspeaker (116) to have low impedances at radio frequencies, the coaxial cable acts as an inductive stub and enables the antennas (102A, 102B) to be further shortened.

14 Claims, 2 Drawing Sheets

ELONGATE PERSONAL COMMUNICATIONS APPARATUS

The present invention relates to an elongate personal communications apparatus, such as a pen-shaped wireless telephone, having an antenna diversity arrangement.

Progress in miniaturization of electronic components has enabled the production of a variety of compact communications devices. One example of such a device is a pen-shaped wireless telephone, such as that disclosed in US-A4,969,180. A major concern in the design of such an apparatus is to provide an effective antenna arrangement which provides good performance in the environments where the apparatus is typically used.

An object of the present invention is to provide an improved antenna arrangement for an elongate personal communications apparatus.

According to the present invention there is provided a personal communications apparatus comprising an elongate body having transceiver circuitry disposed within it, characterised in that the apparatus further comprises first and second spatially separated antennas located at opposite ends of the body, and in that the transceiver circuitry includes a diversity unit coupled to the first and second antennas.

Further advantages are obtained if a microphone is mounted on the first antenna and a loudspeaker on the second antenna, the antennas providing electrical connectivity between the microphone and loudspeaker and the transceiver circuitry. This arrangement facilitates obtaining optimum distance between the microphone and loudspeaker. Also, if the electrical effects of the microphone and loudspeaker are taken into account when the antennas are designed a more compact form is possible.

Embodiments of the present invention will now be described, by way of example, with reference to the accompanying drawings, wherein.

In the drawings the same reference numerals have been used to indicate corresponding features.

Figure 1:
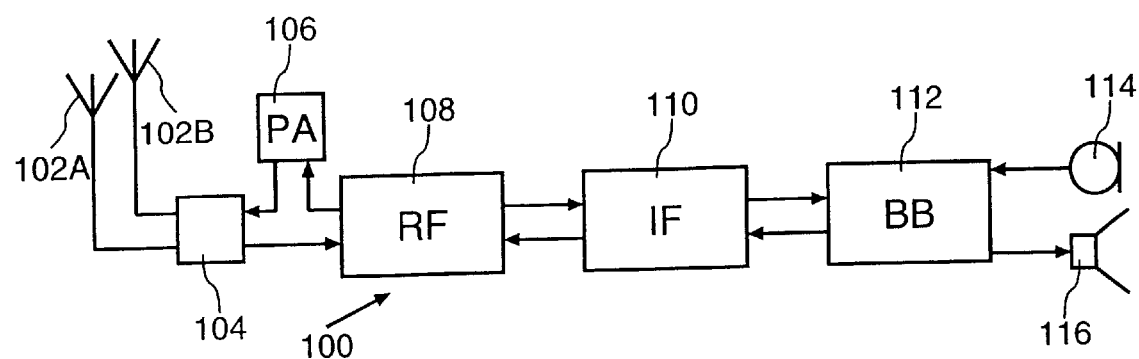
FIG. 1 is a block schematic diagram of a personal communications apparatus.

A block schematic diagram of a personal communications apparatus 100 having an antenna diversity arrangement is shown in FIG. 1. This particular example is based on a GSM (Global System for Mobile communications) cellular telephone, but similar principles apply to other cellular telephony standards and to other personal communications apparatus, for example two-way radio.

Consider first the receiver part of the circuitry operating on a voice telephone call. Two spatially-separated antennas 102A, 102B receive signals from a remote base station, which signals are processed by a diversity unit 104 to generate a single radio frequency (RF) signal. In its simplest form the unit 104 selects the strongest of the two signals, but other combining methods are well known and may be used instead. The RF signal then passes into a RF transceiver block 108, which down-converts the RF signal to a lower intermediate frequency (IF).

The IF signals pass to an intermediate frequency block (IF) 110 which down-converts the IF signal to a baseband signal. This signal then passes to a baseband processing block (BB) 112. This block performs a variety of tasks, including speech decoding, channel decoding and deinterleaving. Received audio signals are converted back to analogue signals for reproduction on a loudspeaker 116 or other suitable output device.

Now consider the transmission side of the circuitry. Voice signals are received by a microphone 114, or other suitable input device, and passed to the baseband processing block 112, where they are converted to digital form. The baseband processing block 112 then encodes the speech and performs channel coding and interleaving to reduce the received bit error rate. The resultant signal for transmission is modulated and passed to the IF block 110. Here the baseband signals are transposed up to an IF frequency.

The IF signal is passed to the RF transceiver block 108 where it is mixed up to the RF transmission frequency and amplified to the required power by a power amplifier (PA) 106. It is then passed to the diversity unit 104 for transmission by one or both of the antennas 102.

Figure 2:
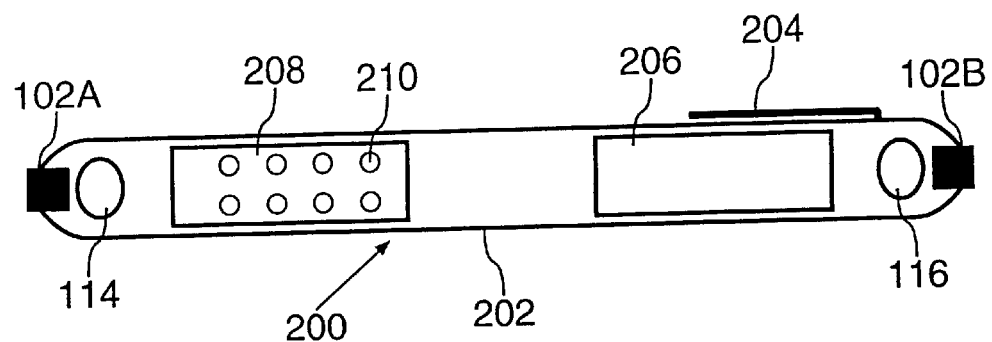
FIG. 2 is a view of a personal communications apparatus made in accordance with the present invention.

One compact form of a personal communications apparatus comprises an elongate body, for example pen-shaped. FIG. 2 is a view of an embodiment of such an apparatus which could be a wireless telephone. The apparatus 200 comprises an elongate body 202 having a clip 204 which may be used to attach the apparatus 200 to a jacket or other clothing when not in use. First and second antennas 102A, 102B are mounted at opposite ends of the body. A preferred embodiment uses helical antennas 102. The majority of the circuitry for the personal communications apparatus is disposed inside the body 202, including a diversity unit 104 coupled to the first and second antennas 102. The microphone 114 and loudspeaker 116 are located behind openings in the body 202. Also provided is a display 206 and means 208 for controlling the apparatus 200, for example a plurality of operating buttons 210.

A condition for obtaining an effective improvement in performance from a diversity arrangement having two antennas is that the field strengths received by each antenna are substantially uncorrelated. Hence, if multipath interference causes the first antenna 102A to be in a null the second antenna 102B is likely to be able to receive a good signal, and vice-versa.

Figure 3:
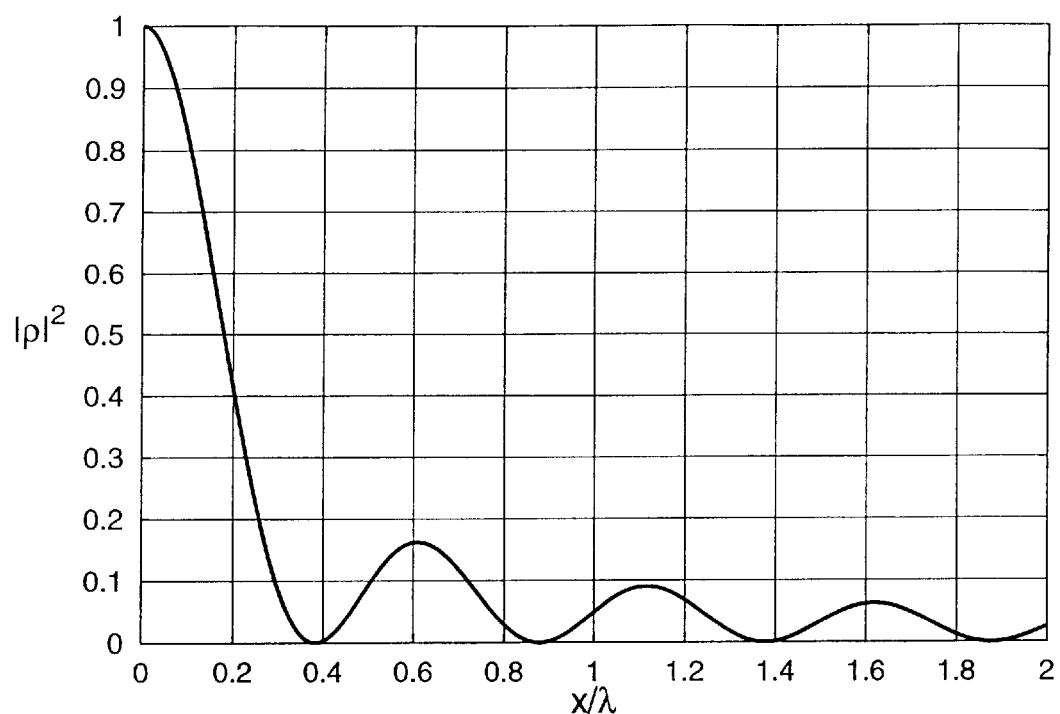
FIG. 3 is a graph showing how the auto-correlation function for the magnitude of the electric field at two points, $|\rho|^2$, varies with separation in wavelengths, $x/\lambda$ of the points.

The spatial correlation of fields in a mobile radio environment was studied in *A Statistical Theory of Mobile-Radio Reception*, R. J. Clarke, Bell Systems Technical Journal, Volume 47 No. 6, pages 957 to 1000. In normal use, with the apparatus 200 held substantially vertically, the first and second helical antennas 102A, 102B receive the vertical component of the electric field. FIG. 3 is a graph showing the variation of $|\rho|^2$, the auto-correlation of the magnitude of the electric field, with the separation x of the two antennas, measured in wavelengths ($\lambda$).

It is generally considered that good diversity operation is achieved when $|\rho|^2$ below 0.5. From FIG. 3 it can be seen that this requires the antennas to be separated by at least $0.2\lambda$. This corresponds to a separation of 6.5 cm at the GSM centre frequency of 925 MHz and 3.0 cm at the UMTS (Universal Mobile Telecommunication System) centre frequency of approximately 2050 MHz. Such a separation can easily be achieved in a pen-shaped or other elongate apparatus such as that shown in FIG. 2, ensuring that the correlation between first and second antennas 102A, 102B is low and the diversity performance is good. Hence, such an apparatus is particularly suitable for a diversity arrangement such as that shown. Further, an elongate apparatus 200 is likely to be held in such a way that the antennas will not be significantly blocked by a user's hand. This ensures that the mean gains of the first and second antennas 102A, 102B are similar, which is also a requirement for good diversity performance.

Figure 4:
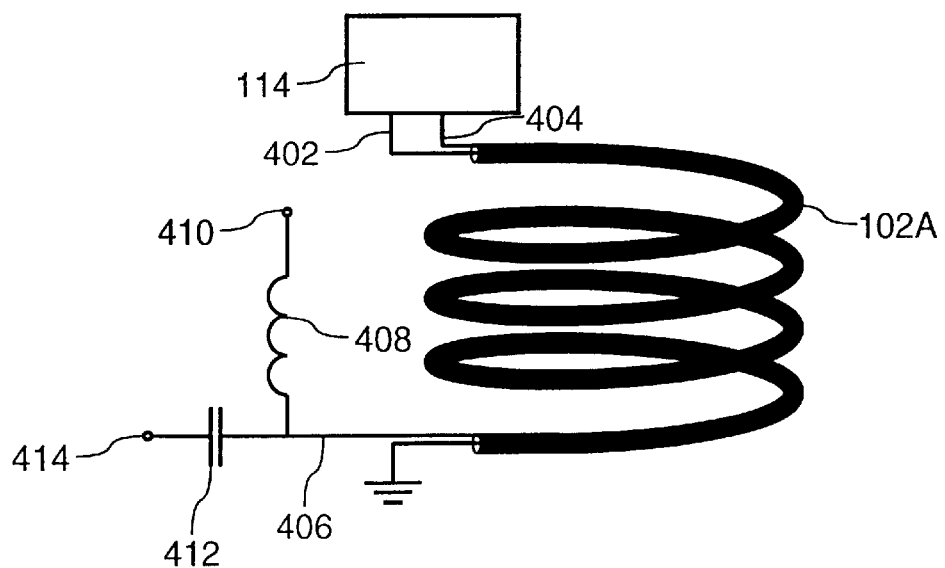
FIG. 4 is a diagram of a helical antenna having an integrated microphone.

A convenient modification of the elongate apparatus 200 shown in FIG. 2 is to mount the microphone 114 on the opposite end of the first antenna 102A to that connected to the transceiver circuitry, as illustrated in FIG. 4. The helical antenna 102A may be formed of coaxial cable, with a connecting wire 402 connecting the microphone 114 to one end of the cable's inner conductor and the other end of the inner conductor being connected to ground. A second connecting wire 404 from the microphone 114 is connected to the cable at the top of the antenna 102A. Alternatively, the antenna 102A may be formed from hollow wire through which the first connecting wire is passed to connect the microphone to ground.

At the bottom of the antenna 102A the audio signals from the microphone 114 and the RF signals received or transmitted by the antenna 102A can easily be separated. A shared connection 406 is made to the outer of the coaxial cable (or the hollow antenna wire) at the bottom of the antenna. From this connection audio signals from the microphone are coupled through a low pass filter (shown here as a single inductor 408) to an audio output 410, while the RF signals are coupled through a high pass filter (shown as a single capacitor 412) to an RF output 412.

Other possibilities could be considered for the connections. For example, two connecting wires from the microphone 114 could pass through a hollow antenna wire, eliminating the need for a filter. Alternatively, the connecting wires could be placed through the centre of the helical antenna 102A, enabling the antenna to be formed of solid wire.

A particular advantage of locating the microphone 114 at the top of the antenna 102A is that the microphone package provides top loading (increasing the radiation resistance and reducing the capacitive reactance), thereby enabling use of a shorter antenna 102A. In an embodiment where the antenna 102A is formed from coaxial cable, if the microphone 114 also presents a low RF impedance it will provide a short circuit at the top of the helical antenna. The transmission line inside the helix is then a short circuit stub, which provides an inductive impedance thereby reducing the capacitive reactance of the antenna 102A and enabling the use of a still shorter antenna 102A.

Alternatively, or in combination with the above modification, the loudspeaker 116 can also be mounted at the opposite end of the second antenna 102B to that connected to the transceiver circuitry. The same considerations apply to this modification as to the combination of the microphone 114 and first antenna 102A.

The embodiments of the present invention described above use a helical antenna. However, other types of physically-shortened electric antennas could be used instead. Such antennas are monopole or dipole-like antennas that are physically smaller than their electrical length, and receive predominantly the electric field. An example of such an alternative antenna is a meander-line antenna.

From reading the present disclosure, other modifications will be apparent to persons skilled in the art. Such modifications may involve other features which are already known in the design, manufacture and use of personal communications apparatus and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

What is claimed is:

1. A personal communications apparatus, comprising:
   a one-piece elongate body including transceiver circuitry disposed within said one-piece elongate body; and
   a first antenna and a second antenna being spatially separated antennas located at opposite ends of said one-piece elongate body, said transceiver circuitry including a diversity unit coupled to said fist antenna and said second antenna.

2. The apparatus as claimed in claim 1, wherein each antenna is a physically-shortened electric antenna.

3. The apparatus as claimed in claim 1, wherein each antenna is a helical antenna.

4. The apparatus as claimed in claim 1, further comprising:
   a microphone, wherein said first antenna includes a first end and a second end, said first end being coupled to said transceiver circuitry and said second end being coupled to microphone.

5. The apparatus as claimed in claim 4, wherein said first antenna is formed from a coaxial cable providing electrical connections between said microphone and said transceiver circuitry.

6. The apparatus as claimed in claim 5, wherein said microphone has a low impedance at radio frequencies, to thereby enable said coaxial cable forming said first antenna to act as an inductive stub.

7. The apparatus as claimed in claim 4, wherein said first antenna is formed from a hollow wire providing a first electrical connection between said microphone and said transceiver circuitry, and
   wherein said hollow wire encloses a conductor for providing a second electrical connection between said microphone and said transceiver circuitry.

8. The apparatus as claimed in claim 4, wherein said microphone provides top loading to said first antenna.

9. An The apparatus as claimed in claim 1, further comprising:
   a loudspeaker, wherein said first antenna includes a first end and a second end, said first end being coupled to said transceiver circuitry and said second end being coupled to said loudspeaker.

10. The apparatus as claimed in claim 9, wherein said first antenna is formed from a coaxial cable providing electrical connections between said loudspeaker and said transceiver circuitry.

11. The apparatus as claimed in claim 10, wherein said loudspeaker has a low impedance at radio frequencies to thereby enable said coaxial cable forming said first antenna to act as an inductive stub.

12. The apparatus as claimed in claim 9,
wherein said first antenna is formed from a hollow wire providing a first electrical connection between said loudspeaker and said transceiver circuitry, and
wherein said hollow wire encloses a conductor for providing a second electrical connection between said loudspeaker and said transceiver circuitry.

13. The apparatus as claimed in claim 9, wherein said loudspeaker provides top loading to said first antenna.

14. The apparatus as claimed in claim 1, further comprising:

a microphone, wherein said first antenna includes a first end and a second end, said first end being coupled to said transceiver circuits and said second end being coupled to said microphone; and a loudspeaker, wherein said second antenna includes a third end and a fourth end, said third end being coupled to said transceiver circuitry and said tough end being coupled to said loudspeaker.

* * * * *